Feb. 26, 1924.                                                1,485,016
F. E. CARDULLO ET AL
GIB FOR SLIDES FOR MACHINE TOOLS AND OTHER MECHANISM
Filed July 13, 1923
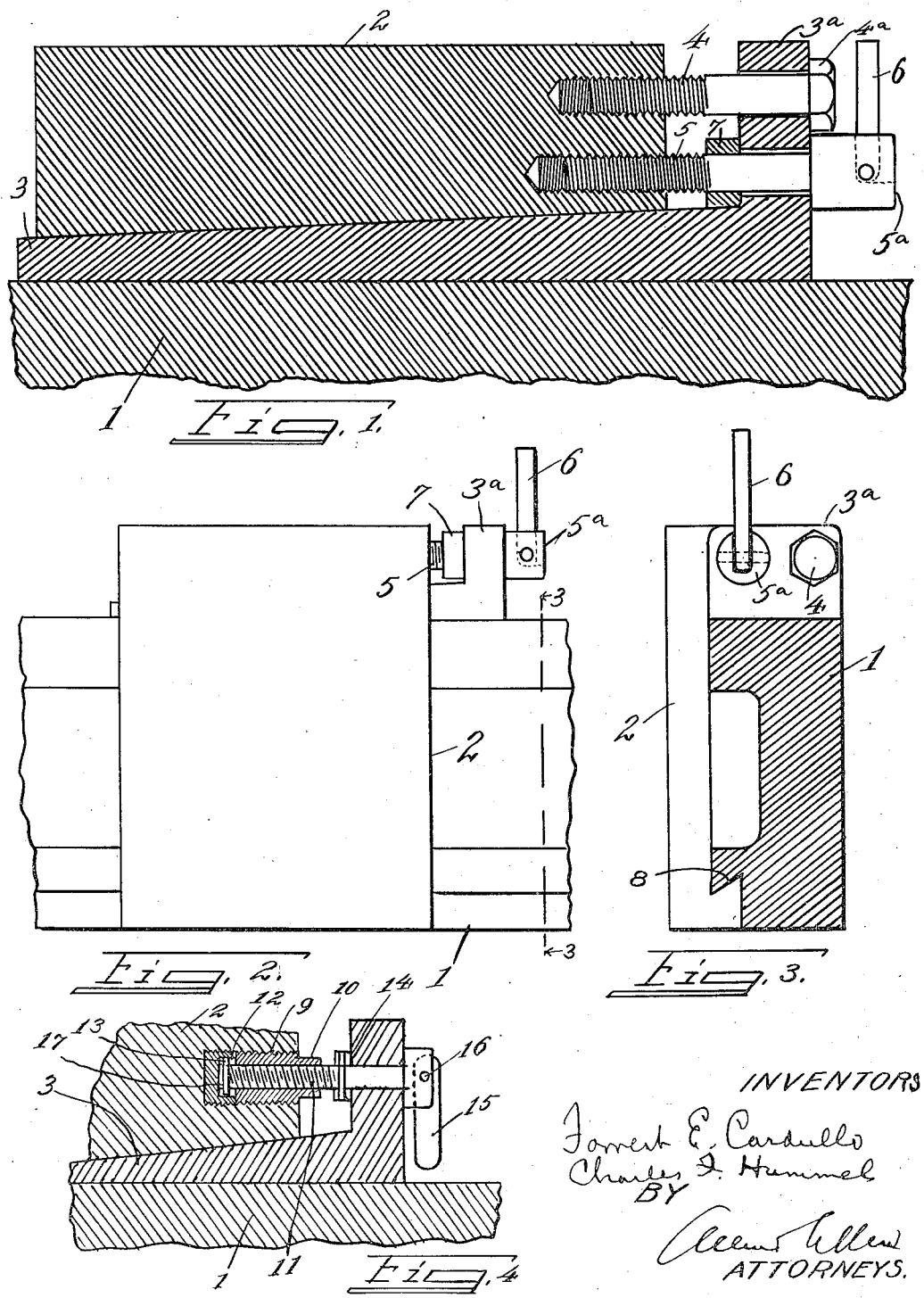
INVENTORS
Forrest E. Cardullo
Charles I. Hummel
BY
Allen Allen
ATTORNEYS.

Patented Feb. 26, 1924.

1,485,016

UNITED STATES PATENT OFFICE.

FORREST E. CARDULLO AND CHARLES T. HUMMEL, OF CINCINNATI, OHIO, ASSIGNORS TO THE G. A. GRAY COMPANY, OF CINCINNATI, OHIO, A CORPORATION OF OHIO.

GIB FOR SLIDES FOR MACHINE TOOLS AND OTHER MECHANISM.

Application filed July 13, 1923. Serial No. 651,251.

*To all whom it may concern:*

Be it known that we, FORREST E. CARDULLO and CHARLES T. HUMMEL, citizens of the United States, and residing in Cincinnati, in the county of Hamilton and the State of Ohio, have invented a new and useful Improvement in Gibs for Slides for Machine Tools and Other Mechanism, of which the following specification is a full disclosure, reference being made to the drawings accompanying this specification.

Our invention relates to gibs for sliding parts in machine tools, and to mechanisms for tightening and locating such gibs. The object of this invention is to provide a secure and simple method of clamping a sliding part to a fixed guide, when it is desired to do so, by means of a gib, and also to permit the sliding part to slide smoothly on the guide without undue friction or play.

Machine tools, such as lathes, planers, and boring mills are often equipped with tool carrying members which must slide smoothly, and without undue friction or play, upon fixed members or guides.

In order to make the work of construction easier and provide adjustment when the mechanism wears, some form of adjustable gib is usually employed. This gib is adjusted until the lost motion or play between the slide and the guide is the least possible which will permit smooth motion without binding or undue friction.

In the case of such a sliding member it is frequently necessary to fasten it in place so that it will not move while the tool that it carries is cutting. It is also frequently desirable to increase the friction between the slides and the guide so that there will be sufficient resistance to take up all the lost motion in the train of mechanism which moves the slide. Screws called tightener screws are in use which turn in the slide and bear against the guide or against an intermediate friction piece. Tightening this screw will clamp the slide fast or merely increase the friction between the fixed guide and the movable slide according to the degree of force applied. Such a screw bears at one point only and is apt to mar the guide.

One of the great advantages of our invention is that the entire gib can be tightened by one movement, so as to increase the friction or clamp the slide fast, and be returned by a contrary movement to the properly adjusted position for sliding, without taking the time necessary to readjust it.

Thus our invention contemplates not only the improvement in gib mounting and adjusting, but also the fixing of normal sliding position for the gib to which it is forced by the withdrawal of the gib tightening means. In the tightener screw or set screw devices of the past, where the set screws bear directly on the gib and force it to clamping position, the release of the screws does not lift the gib to sliding position, but merely relieves the tension thereon.

We accomplish the object above named by the mechanism described below and illustrated in the accompanying drawings.

Figure 1 is a diagrammatic section through such a gib, guide and slide.

Figure 2 is a front view of the mechanism applied to the saddle of a planer.

Figure 3 is a cross section of the rail taken on line 3—3 in Figure 2.

Figure 4 is a section on a smaller scale from Figure 1, showing a modification.

In Figure 1, 1 is the fixed guide which may be the rail, housing or bed of a machine tool, or any similar part. 2 is the sliding part, which may be a saddle, carriage, or slide or some similar part.

3 is a wedged shaped gib which has a head $3^a$, extending at right angles in this instance from the end of the gib. 4 is a screw threaded into the slide and passing through a hole in the head of the gib. By screwing down upon this screw, the gib is advanced into the wedge-shaped opening between the guide and the slide, until the play between them has been properly taken up. The screw 4 when once set, determines by means of the head $4^a$, the sliding position of the gib, that is to say, the position of setting of the gib when the part 2 is permitted to slide smoothly.

5 is a second screw, also threaded into the slide and passing through a second hole in the head of the gib. The head $5^a$ of this screw is slotted and in the slot is pivoted a short bar 6 by means of which it may be turned. To the screw 5 is pinned or otherwise fixed the collar 7 in such a position that the head of the gib $3^a$ fits with very slight play between the head of the screw $5^a$ and the collar 7, so that the screw can turn in the hole in the head of the gib.

By turning screw 5 in a clock-wise direction (assuming a right hand thread) the gib may be wedged into the space between the guide and the slide with any desired degree of force. By turning the screw in a counterclock-wise direction, the gib will be positively withdrawn until the head 3ᵃ comes in contact with head of screw 4, when the gib will be in the properly adjusted position. Thus by adjusting screw 4 the gib will take up the lost motion between the slide and the guide, until the slide moves smoothly and without play on the guide, thus having snug sliding contact. When it is desired to increase this friction, the screw 5 may be screwed up slightly, and when it is desired to clamp the slide fast, the screw 5 may be screwed up firmly. When it is again desired to move the slide, the screw 5 may be drawn back as far as it will come and collar 7 will move the gib 3 back into the correctly adjusted position for snug sliding contact, as governed by the head 4ᵃ.

In the two other figures we have maintained the same numerals, letting 1 show the cross rail of a planer and 2 the saddle thereof. The gib parts are also numbered the same.

It will be noted that we have shown the saddle as engaging in a dovetail groove 8 on the lower end of the rail, while the gib engages on the top of the rail. In such an arrangement the tightening of the gib to clamping position, does not tend to force the saddle to spring away from the rail at any point, but on the contrary pulls it tighter to the rail at the face thereof, due to the action of the dovetail rib and groove construction. This is obviously greatly superior to a tightener screw device where the screws bear directly against the face of the rail, a structure often used in planers.

The mechanism may of course be modified in a number of ways. For instance, a lock nut may be applied to screw 4 or screw 5 may be made to perform the function of both screws by providing some means for limiting the backward motion of screw 5. We, therefore, do not wish to confine our invention to the exact form shown, but to include all forms falling within the scope of the following claims.

Thus we show a modified form using a single screw in the gib, but accomplishing the same functions as the device heretofore described. The slide 2, and fixed guide 1, and gib 3, are shown as before. The slide has a large tapped hole 17 therein, into which is threaded a hollow nipple 9, having a hexagon head 10, by means of which it may be manipulated with a wrench. The gib screw 11 is threaded to screw within the nipple, which is internally threaded to receive it, and a nut 12 is pinned to the screw 11 at the point noted at 13, as is the collar 14, at the point noted for it. The screw 11 passes through the head 3ᵃ of the gib, and has a grooved head in which is mounted a handle 15, by means of a pin 16.

As so constructed the screw 11 is thrust through the head of the gib, and the collar 14 pinned in place, to hold the screw against axial movement in the gib head. The nipple 9 is then screwed over the screw 11, and the nut 12 pinned in place. The gib is then inserted beneath the slide, and the nipple 9 screwed into the slide hole. By screwing the gib screw backwardly until the nut 12 is in abutment with the inner end of the nipple, and adjusting the position of the nipple, a proper setting of the gib for smooth even sliding motion to the slide, can be readily arranged. Then leaving the nipple as it is, the gib screw can be turned within the nipple, drawing the gib tighter beneath the slide to a clamping position, using the handle 15.

Having thus described our invention, what we claim as new and desire to secure by Letters Patent, is:—

1. In combination, a guiding member, a sliding member movable thereon, a wedge-shaped gib adapted to draw the said sliding member into snug sliding contact with the said guiding member, a screw adapted to limit the retraction of the said gib, and means adapted to wedge the said gib more firmly into place.

2. In combination, a guiding member, a sliding member movable thereon, a wedge-shaped gib adapted to draw the said sliding member into snug sliding contact with the said guiding member, a screw adapted to wedge the gib more firmly into place, and means for holding the gib in properly adjusted position when the said screw is loosened.

3. In combination, a guiding member, a sliding member movable thereon, a wedge-shaped gib adapted to draw the said sliding member into snug sliding contact with the said guiding member, a screw adapted to limit the retraction of the said gib, and a second screw adapted to wedge the gib more firmly into place.

4. In combination, a guiding member, a sliding member movable thereon, a wedge-shaped gib adapted to draw the sliding member into snug sliding contact with the guiding member, means for adjusting the said gib, and means for wedging the said gib more firmly into place without disturbing the said adjusting means.

5. In combination, a guiding member, a sliding member movable thereon, a wedge-shaped gib adapted to draw the said sliding member into snug sliding contact with the said guiding member, means for wedging the said gib more firmly into place, means for withdrawing the said gib from firm contact, and means for limiting the retraction of the said gib.

6. In combination, a guiding member, a sliding member movable thereon, a wedge-shaped gib adapted to draw the said sliding member into snug sliding contact with the guiding member, a screw adapted to wedge the said gib more firmly into place, means on the said screw adapted to retract the said gib, and a second screw adapted to limit the retraction of the said gib.

7. In combination, a guiding member, a sliding member movable thereon, a wedge-shaped gib adapted to draw the said sliding member into snug sliding contact with the said guiding member, a screw adapted to adjust the said gib, and a second screw adapted to wedge the said gib firmly into place and to retract said gib to the adjusted position.

8. In combination, a sliding member to carry a tool or the like, a gib to fit the sliding member, a standard secured to the said gib, a screw rotatably but non-slidably engaging the gib standard, the said sliding member having a threaded hole to be engaged by the said screw, and means for indicating the adjusted position of the said gib.

9. In combination, a sliding member to carry a tool or the like, a gib to fit the sliding member, a standard secured to said gib, a screw rotatably, but non-slidably engaging the gib standard, said sliding member having a threaded hole to be engaged by the said screw, and an additional screw in the sliding member, said screw carrying an abutment for the gib.

FORREST E. CARDULLO.
CHARLES T. HUMMEL.